Oct. 14, 1930.  L. S. BAIER  1,778,479

CONFECTION

Filed Dec. 7, 1926

INVENTOR
Ludwig S. Baier
BY C. B. Birkenbeuel
ATTORNEY

Patented Oct. 14, 1930

1,778,479

UNITED STATES PATENT OFFICE

LUDWIG S. BAIER, OF PORTLAND, OREGON, ASSIGNOR, BY MESNE ASSIGNMENTS, TO ICE CREAM SMACK CORPORATION, A CORPORATION OF DELAWARE

CONFECTION

Application filed December 7, 1926. Serial No. 153,112.

This invention relates generally to the confectioner's art, and particularly to a special form of chocolate cylinder reinforced with paper and filled with ice cream or other filling.

The first object of this invention is to provide an ice cream filled chocolate cylinder open at one end and protected and supported against heat and breakage by a paper cylinder, which also serves as a mold for the formation of the cylinder.

The second object is to produce a confection having a frozen filling in which the contents of the confection are always in view, thereby preventing the danger of the melting of the frozen filling which it would be impossible to return to a frozen expanded state without mechanical agitation.

The third object is to so form the confection that it may be produced by the introduction of either hard or soft cream.

The fourth object is to so form the confection that its chocolate coating can be extremely uniform in thickness and that this thickness can be regulated at will by means of temperature changes or the addition of butter fat or other fats commonly used with chocolate.

The fifth object is to form the confection by a process which will at once reduce the cost of manufacture and increase the desirability of the finished product from the customer's view point to a degree which will make same a higher commercial article.

The sixth object is to so form the confection that when necessary the outer chocolate cylinders with their paper coverings can be formed at one point and immediately filled ready for the trade or can be held and filled at a later date or shipped to a distant point where they can be filled by the vender, although it must be understood that it is preferable to fill them immediately after the formation of the chocolate cylinders.

Figure 1:
Figure 2:
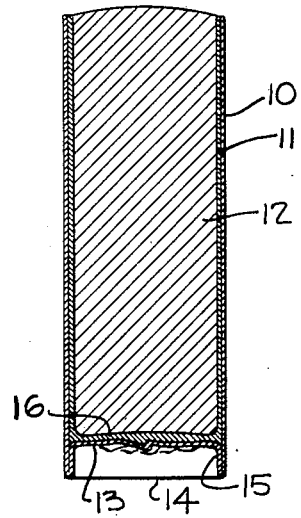
Figure 3:
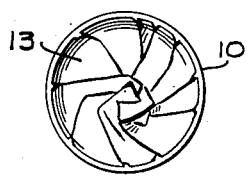
Figure 4:
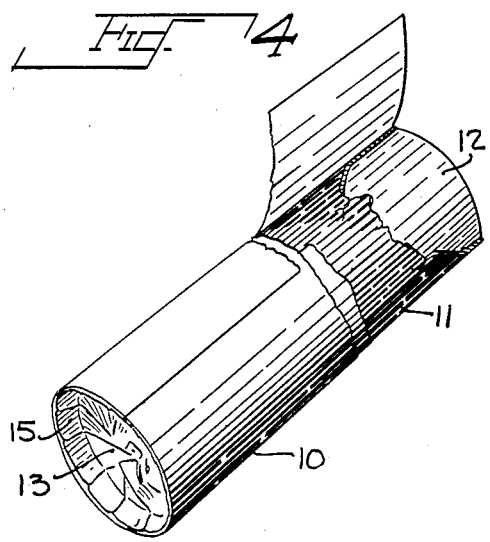

These, and other objects, will become more apparent from the specification following as illustrated in the accompanying drawing, in which:

Fig. 1 is a side elevation of the completed confection of which Fig. 2 is a vertical section and Fig. 3 a bottom view. Fig. 4 is a perspective view of the completed confection with a portion of its paper covering torn aside and a portion of its chocolate cylinder broken away to disclose the frozen contents.

Similar numbers of reference refer to similar parts throughout the several views.

Referring in detail to the drawing, the confection itself consists of three parts, namely a paper mold 10 in which is formed a chocolate cylinder 11 which receives ice cream or other suitable filling 12. The mold 10 is formed by rolling a sheet of paper into the form of a cylinder and then turning in one edge and crimping it to form a bottom 13 which is held a short distance above the lowermost line 14 of the mold 10 by means of the flange 15.

In the paper mold 10 is the chocolate cylinder 11 which completely covers the cylindrical side walls of the mold 10 above the bottom 13, and also is provided with a bottom 16 which is integral with the side walls of the chocolate cylinder. The filling 12, if ice cream is employed, is in its expanded and frozen state when the confection is ready for the market.

The process of forming these confections is preferably as follows: First, the cylindrical paper mold 10 is completely formed and placed in a suitable support which will insure its being held to a true cylindrical form. Melted chocolate is now inserted into the mold and the mold is then inverted, preferably inclining same first in one position and then in the other, to insure a complete coating of the entire interior surface of the mold. The surplus chocolate drips out into a suitable receiver from which it is returned to the melting pot.

The next step in the formation of this confection varies according to the local conditions namely, whether the confections are to be sold within the shipping radius of ice cream or whether the chocolate cylinders are to be shipped a great distance or held for some length of time prior to being retailed.

If it is desired to complete the confection at once, soft ice cream or ice cream which has been mechanically agitated to increase its bulk and partially frozen is now inserted into the relatively soft chocolate cylinder, which action almost instantaneously solidifies the chocolate. The paper mold with its contents is then removed from its support and placed in a refrigerator where the freezing process is completed, which may add a little more to the bulk of the cream thereby more completely filling the chocolate cylinder and increasing its rigidity.

If it is desired to postpone the filling of the confection to a later date, or after shipping these chocolate cylinders, other means must be provided to complete the congealing of the chocolate. In other words—when the surplus chocolate is poured out of the mold that which clings thereto is partially pre-cooled but not sufficiently so for the purpose of handling. However, when the cold cream is inserted into the partially congealed chocolate cylinder the congealing becomes almost instantaneous, owing to the fact that the chocolate is solid at ordinary room temperatures, while the temperature of the cream is, of course, much lower.

It must be understood that while the paper mold is a very convenient carrier for advertising and display purposes it has several other functions whose interaction tends to enhance the value of this confection.

The paper is torn off when eating the confection, somewhat in the fashion shown in Fig. 4, the fingers being protected from contact with the chocolate coating, which would otherwise melt under the temperature of the fingers. Again, the chocolate is protected from contact with the fingers, namely in a sanitary sense.

As the bottom of the paper mold, jacket or shell is formed by folding over a portion of one end of the rolled paper it will assume a form such as indicated in Figures 3 and 4, portions lapping over other portions. This provides a convenient means for interlocking the chocolate at 16 with the jacket or shell 10 at 13 and ensures the contents of the paper jacket from falling out even though the paper be torn away down to the bottom 13.

Another advantage of the paper mold resides in the fact that it would be quite difficult to remove these confections from a metal mold without the employment of the paper. In other words—the container in which the paper molds are placed is actually the mold, and the paper 10 really becomes the liner for the mold which remains with the finished product.

Another feature of importance in connection with the paper covering is the support which this paper provides for the confection, owing to the close contact between these two articles. For instance, if the chocolate cylinder were merely formed in a metal mold and then wrapped in paper the ultimate strength of the chocolate cylinder would be much less than when formed, as above described, as can readily be understood.

This is due to the fact that when the cold cream comes in contact with the chocolate (which is still relatively soft) there is actually a slight blending of the two substances, which causes same to adhere. This is not the case where cold cream is brought into contact with cold or solid chocolate.

It must here be stated that one of the greatest objections to the dipping of frozen substances into molten chocolate is the necessity of introducing approximately twenty per cent of fats or oils to secure the proper consistency. Even with this dilution, which is made at a great sacrifice to the quality and taste of the chocolate portion of the confection, it is an impossibility to maintain anything like a uniform deposit on the frozen centers.

Another feature of extreme importance is the fact that confections of this nature are usually sold in containers specifying a minimum weight. This being the case it can easily be seen that in order to exceed the minimum those methods in which the deposit of chocolate is irregular or difficult to control must in each instance give a greater overweight than is actually necessary if my process is employed. All of the various steps in my process tend toward the elimination of labor and undue waste, as well as the possibility of contamination by contact due to handling.

It is a well known fact that ice cream has long been enclosed in chocolate in which the mass of cream is actually dipped into the molten chocolate, this process being employed in the formation of what is commonly known as "cannon balls", and in later years embodied in rectangular slices of ice cream and completely sealed in chocolate. While there is a seeming similarity in these articles and the one above described it is found in practice that one of the greatest difficulties encountered in the dipping of solid ice cream bodies into molten chocolate is eliminated. This difficulty resides in the seeming impossibility to maintain any degree of uniformity in the thickness of the chocolate coating, due to the constant change in temperature in the chocolate body within the dipping tank.

With this device the paper mold 10, which is a poor conductor of heat, is practically at room temperature. The temperature of the incoming chocolate can easily be maintained so that having a uniform insertion of chocolate into the paper mold and a uniform handling of the mold containing this chocolate, it is easy to see that an extremely uniform thickness of chocolate coating will be deposited on the inner walls of the mold.

It will further be noted that by reason of the counter-sinking of the bottom 13, when the article is set down as in the position shown in Figure 2 on a support the space beneath the bottom 13 constitutes a dead air chamber. Thus if, perchance, the article is set down on a warm support as sometimes occurs in dispensing in a store, the dead air space will temporarily act as a heat insulator to prevent a quick melting of the materials at the bottom. Furthermore, as the article is eaten the flange 15 serves as a convenient means for gripping the article while eating the last portion thereof.

Experience has shown that when the hot chocolate is introduced into the paper cylinder it adheres to the wall of the cylinder by reason of the sticky condition of hot chocolate. Upon placing the semi-frozen ice cream into the still more or less fluid chocolate the chocolate shell is instantly congealed and solidified and in doing so contracts sufficiently to break the adhesion between the chocolate and the paper, except at the bottom where the chocolate is interlocked with the folds of the paper. Thus the paper can be unwound in strips from the chilled chocolate without the chocolate breaking away, as would be the case were the adhesion between chocolate and paper continued.

Experience has also shown that the introduction of the partially frozen ice cream into the relatively soft or fluid chocolate cylinder not only results in an almost instantaneous solidification of the chocolate and the breaking of the adhesion between the chocolate and the paper cylinder or jacket but the ice cream and chocolate fuse together, as it were, where they come into contact. In other words, upon the introduction of the semi-frozen ice cream into the still fluid chocolate shell or cylinder, an adhesion, cementation or fusion of the ice cream and the chocolate takes place at the same time that the solidification of the chocolate occurs and the adhesion between the chocolate and the paper cylinder ceases. That this is true is evidenced by the fact that when one takes the finished article and tears off the wrapper, as above described, it is found that the chocolate is not stuck to the paper. Then, if an attempt is made to break the chocolate shell away from the ice cream interior, it is found that the ice cream is sticking to the chocolate of the shell.

I am aware that many forms of confections have been constructed in the past; I therefore do not intend to cover such confections broadly, but I do intend to cover all such forms and modifications of same as fall fairly within the appended claims.

I claim:

1. As a new article, a jacket composed of a sheet strip wound around an axis, one end of the jacket being folded over toward the axis to constitute a bottom, an edible shell lining the walls of said jacket, an edible filler for the shell, said shell being in tight contact with said jacket and said jacket being adapted to be unwound by tearing it along a line in a plane approximately normal to the axis of the jacket, said jacket being of a greater length than its contents so as to project beyond the bottom and leave a bottom flange for the purposes specified.

2. A method of forming chocolate coated confections consisting in forming a paper mold open at one end, injecting molten chocolate into said mold, turning said mold through such positions as will ensure a complete coating of its interior and the removal of the surplus chocolate therefrom, then injecting a semi-frozen cream into said mold while the chocolate is still soft, then completely freezing said filling.

3. A method of making confection which consists in taking a paper shell, giving it a lining of hot liquid confection material, filling the lining with a cold confection material while the hot material is still soft, thereby congealing said lining, and thereafter subjecting the mass to further temperature reducing treatment whereby to solidify the filler and harden the lining further.

4. A method of forming chocolate shells containing ice cream, which consists in forming a fluid chocolate shell and at the same time maintaining the shell in form, filling said shell with semi-frozen ice cream, thereby simultaneously solidifying the chocolate of the shell and making it self-sustaining, and then subjecting the mass to further temperature reducing treatment to harden the ice cream.

5. In a method of making ice cream confections having centers which are liquid at normal temperatures and which set or solidify on freezing; the method consisting in forming, in molds, fluid chocolate shells which are to form the containers or cups of the produced confection; then while such shells are still hot and in a fluid condition filling said shells with comparatively cold centers and, by heat exchange between the shells and centers, reducing the temperature of the shells to a point where the shells become substantially set; then subjecting the shells and contents to refrigeration to solidify the centers and cool the shells to approximately the same temperature as the centers substantially as and for the purposes described.

6. The method of forming chocolate coated confections which consists in forming a paper mold open at one end, covering the inner surface of the mold with a film of molten chocolate whereby the chocolate will adhere to the paper of the mold, placing a semi-frozen mass within the chocolate film while the chocolate is still fluid, thereby congealing the chocolate into a shell and simultaneously breaking the adhesion between the chocolate and the mold, and thereafter subjecting the mass to further temperature reduction treatment.

7. The method of forming chocolate coated confections which consists in forming a paper mold open at one end, injecting molten chocolate into the mold whereby a portion of the molten chocolate will adhere to the mold, draining off surplus chocolate, injecting semi-frozen cream into the mold while the chocolate is still soft and adhering to the paper, thereby to harden the chocolate and break the adhesion between chocolate and paper, and then subjecting the mass to further temperature reduction to complete the freezing of the cream.

8. The method of forming chocolate coated confections consisting in forming a paper mold closed at the bottom, placing a film of molten chocolate on the inner surface of the mold whereby the molten chocolate film will adhere thereto, then introducing semi-frozen cream into the mold while the chocolate film is still soft, thereby to harden and set the chocolate and cause a sufficient contraction thereof to break the adhesion between the chocolate and the wall of the mold, and then subjecting the mass to further temperature reducing treatment to freeze the cream.

9. The method of forming frozen confections consisting in forming a paper mold open at one end, placing a film of molten edible substance in the mold in contact with its inner surface whereby the film will adhere thereto, causing the film to mechanically interlock with the bottom of the mold, introducing a semi-frozen edible substance into the mold while the film is still fluid, thereby to congeal and set the film and break the adhesion between the film and the mold, the mechanical interlocking between the film and the bottom of the mold being maintained, and thereafter subjecting the mass to further temperature treatment for the purposes specified.

10. As a new article of manufacture, a paper cylinder, a chocolate shell within the cylinder and in intimate contact with the walls of the cylinder, and a filling of ice cream in the chocolate shell fused to the shell, said paper cylinder adapted to be torn away from the chocolate cylinder and detached therefrom save at the bottom, said paper cylinder having a roughened bottom adapted to provide interlocking spaces, and said chocolate shell having portions projected into said interlocking spaces in order to interlock the chocolate shell with the bottom for the purpose specified.

11. The method of forming chocolate coated ice cream bars, which consists in taking a paper cylinder open at one end, giving the same an adhering lining of hot fluid chocolate, then, while the lining is still fluid, setting the same by the introduction of semi-frozen ice cream and simultaneously causing the ice cream to fuse with or adhere to the lining and causing the adhesion between the lining and the paper cylinder to be broken, and thereafter subjecting the mass to further temperature treatment to complete the freezing of the ice cream.

12. The method of making confections which consists in taking a paper shell, lining it with a hot liquid confection material that will adhere when hot to said paper shell, filling the lining with a cold confection material that will fuse with said hot confection material and simultaneously harden and set said lining and break the adhesion between said lining and said paper shell, and thereafter subjecting the mass to further temperature reducing treatment whereby to solidify the filler and harden the lining thereof.

LUDWIG S. BAIER.